United States Patent Office 2,889,247
Patented June 2, 1959

2,889,247

ALKYL SULFONYLNAPHTHALENE SULFONAMIDES AND PHARMACEUTICAL COMPOSITIONS THEREOF

Harold Crowther Brimelow and Charles Henry Vasey, Manchester, England, assignors to Imperial Chemical Industries Limited, London, England, a corporation of Great Britain No Drawing. Application July 31, 1956
Serial No. 601,109

Claims priority, application Great Britain August 8, 1955

5 Claims. (Cl. 167—51.5)

This invention relates to new sulphonamides and more particularly it relates to new sulphonamides which possess valuable therapeutic properties, for example diuretic properties.

According to the invention we provide the said new sulphonamides which are naphthalene derivatives wherein one benzene ring of the naphthalene nucleus bears as substituent the group $SO_xR$ wherein $x$ stands for 1 or 2 and wherein R stands for an alkyl radical of not more than 6 carbon atoms or for a phenyl radical which may optionally be substituted, wherein the same or the other benzene ring of the naphthalene nucleus bears as substituent the group $SO_2NHR'$ wherein R' stands for hydrogen or for an alkyl radical of not more than 6 carbon atoms which may optionally be substituted, and wherein the naphthalene nucleus may optionally bear one or more further substituents.

Particularly suitable substituents in the phenyl radical may be for example halogen atoms for example one or more chlorine atoms.

According to a further feature of the invention we provide a process for the manufacture of the said new sulphonamides which comprises oxidising a corresponding compound which bears, in place of the —$SO_xR$ substituent, the substituent —$SO_yR$ wherein $y$ stands for 0 or 1.

As suitable oxidising agents there may be mentioned for example hydrogen peroxide, chromium trioxide and potassium permanganate.

The reaction may be carried out in the presence of an inert solvent or diluent for example acetic acid or aqueous media for example aqueous acetic acid and the reaction may also be assisted or completed by the application of heat.

According to a further feature of the invention we provide another process for the manufacture of the said new sulphonamides which comprises reacting a corresponding compound which bears, in place of the —$SO_2NHR'$ substituent, the substituent —$SO_2X$, wherein X stands for halogen, with a compound of the formula $NH_2R'$ wherein R' has the meaning stated above.

The reaction may be carried out in the presence of an inert solvent or diluent for example water and aqueous media for example aqueuos acetone or a mixture of water and ether and the reaction may also be assisted and/or completed by the application of heat.

As stated above we have found that the new sulphonamides of the invention for example 4-ethylsulphonylnaphthalene-1-sulphonamide possess valuable therapeutic properties and especially they possess diuretic properties in useful degree.

According to a further feature of the invention we provide new pharmaceutical compositions which comprise, as active ingredient one or more of the said new sulphonamides.

The said pharmaceutical compositions may be in the form of tablets or pills in which the active ingredient or ingredients are mixed with pharmaceutical excipients suitable for the provision of the said tablets or pills. Suitable excipients may be for example a diluent, for example calcium carbonate or lactose, a disintegrating agent for example maize starch, a lubricating agent for example stearic acid or magnesium stearate and a granulating agent or binding agent for example starch paste, gelatin solution or gum acacia. The tablets or pills may furthermore be coated. The proportion of active ingredient or ingredients in such tablets or pills is preferably not less than 5% by weight and not more than 90% by weight of the composition.

The said pharmaceutical compositions may furthermore be in the form of aqueous dispersions in which the active ingredient or ingredients are mixed in aqueous media with pharmaceutical excipients suitable for the provision of stable aqueous dispersions. Suitable excipients may be for example a suspending or dispersing agent, for example a neutral hydrophilic colloid for example sodium carboxymethylcellulose and a wetting agent for example a polyethyleneoxycetanol and preferably also a preservative, for example an ester of p-hydroxybenzoic acid, for example methyl p-hydroxybenzoate. The pharmaceutical compositions may also contain one or more suitable colouring agents and one or more flavouring agents. The proportion of active ingredient or ingredients in such aqueous dispersions is preferably not less than 0.5% by weight and not more than 50% by weight of the composition. Those aqueous dispersions which contain a proportion of active ingredient less than 0.5% by weight of the composition lead to excessive doses of the composition to be administered and those aqueous dispersions which contain a proportion of active ingredient more than 50% by weight of the composition may be too viscous for convenient administration.

The invention is illustrated but not limited by the following examples in which the parts are by weight:

*Example 1*

A solution of 16 parts of 4-ethylthionaphthalene-1-sulphonamide in 90 parts of acetic acid is treated with 45 parts of 30% aqueous hydrogen peroxide and the mixture is heated at 95–100° C. for 30 minute. It is then cooled to 20° C. and filtered. The solid residue is washed with 50% aqueous acetic acid, then with water and is then crystallised from ethanol and dried. 4-ethylsulphonylnaphthalene-1-sulphonamide is obtained, M.P. 198° C.

The 4-ethylthionaphthalene-1-sulphonamide used as starting material may be obtained from 1-aminonaphthalene-4-sulphonic acid by first diazotising it and then heating the diazonium salt so obtained with a solution of potassium ethyl xanthate in presence of sodium carbonate to yield a solution of the sodium salt of 4-thionaphthalene-1-sulphonic acid. This is treated with ethyl sulphate in presence of sodium hydroxide and the sodium salt of 4-ethylthionaphthalene-1-sulphonic acid so obtained is converted to the corresponding sulphonyl chloride by heating it with a mixture of phosphorus pentachloride and phosphorus oxychloride, which is then treated with ammonia to yield 4-ethylthionaphthalene-1-sulphonamide of M.P. 141–2° C.

*Example 2*

A solution of 17 parts of 5-ethylthionaphthalene-1-sulphonamide in 150 parts of acetic acid is treated with 75 parts of 30% aqueous hydrogen peroxide and the mixture is heated at 95–100° C. for 45 minutes. The reaction mixture is cooled to 20° C. and filtered. The solid residue is washed with 50% aqueous acetic acid, then with water and is then crystallised from a mixture of methanol and water and dried to give 5-ethylsulphonylnaphthalene-1-sulphonamide, M.P. 218° C.

The 5-ethylthionaphthalene-1-sulphonamide used as starting material may be obtained from 1-aminonaphthalene-5-sulphonic acid by a process similar to that described for the preparation of 4-ethylthionaphthalene-1-sulphonamide at the end of Example 1. The separation of the sodium salt of the 5-ethylthionaphthalene-1-sulphonic acid from the reaction solution is assisted by the addition of sodium chloride. The 5-ethylthionaphthalene-1-sulphonamide so obtained is crystallised from ethanol and then has M.P. 156–158° C.

Example 3

A solution of 60 parts of 1-ethylthionaphthalene-7-sulphonamide in 200 parts of acetic acid is treated with 100 parts of 30% aqueous hydrogen peroxide and the mixture is heated at 95–100° C. for 60 minutes. The solution is cooled to 20° C. and water is then gradually added until a solid precipitate is obtained. The mixture is filtered and the solid residue is dried and is then crystallised from acetic acid. After two recrystallisations from ethanol there is obtained 1-ethylsulphonylnaphthalene-7-sulphonamide, M.P. 231–232° C.

The 1-ethylthionaphthalene-7-sulphonamide used as starting material may be obtained from 1-aminonaphthalene-7-sulphonic acid by diazotisation and then heating the diazonium salt with an aqueous solution containing potassium/ethyl/xanthate, sodium carbonate and sodium hydroxide. The solution of the sodium salt of 1-thionaphthalene-7-sulphonic acid so obtained is treated with ethyl sulphate in the presence of sodium hydroxide and after acidifying the resultant solution with aqueous hydrochloric acid, an aqueous solution of barium chloride is then added until no more precipitate is formed. The barium salt of 1-ethylthionaphthalene-7-sulphonic acid is filtered off, dried and converted to the corresponding sulphonylchloride by treatment with a mixture of phosphorus pentachloride and phosphorus oxychloride. A solution of the sulphonyl chloride in acetone is then treated with ammonia to yield 1-ethylthionaphthalene-7-sulphonamide.

Example 4

A stirred mixture of 67 parts of 2-methylsulphonyl-6-aminonaphthalene, 141 parts of concentrated aqueous hydrochloric acid and 300 parts of water is treated with a solution of 21.1 parts of sodium nitrite in 90 parts of water at 5–10° C. The solution is then added during 15 minutes to a stirred solution of 68 parts of potassium/ethyl/xanthate and 106 parts of sodium carbonate in 400 parts of water. The mixture is stirred for 2 hours, allowed to stand at 20–25° C. for 16 hours and is then filtered. The solid residue is added over 15 minutes to a rapidly stirred boiling solution of 160 parts of sodium hydroxide solution (density=1.35) and 400 parts of water. The stirred mixture is boiled for a further 15 minutes, cooled to 20° C. and then acidified with 147 parts of concentrated aqueous hydrochloric acid. The mixture is then cooled in ice water and filtered and the solid residue is washed with water and suspended in 600 parts of benzene. 50 parts of water are added and chlorine is passed into the rapidly stirred mixture at 5–15° C. during about 90 minutes until no further reaction takes place. The suspension is filtered and the solid residue is washed with a little benzene. The sulphonyl chloride so obtained is suspended in 800 parts of acetone, 175 parts of an aqueous solution of ammonia (density=0.88) are added and the mixture is then stirred at 20–25° C. for 16 hours. The mixture is then diluted with 800 parts of water and filtered. The solid residue is washed with water and the moist product is added to a solution of 55 parts of aqueous sodium hydroxide solution (density=1.35) and 750 parts of water at 70–75° C. After stirring for 5 minutes, the suspension is treated with 5 parts of carbon and then filtered. The filtrate is then acidified with 59 parts of concentrated aqueous hydrochloric acid at 50–60° C. After cooling to 20° C. the mixture is filtered and the solid residue is washed well with cold water and then crystallised from acetic acid and dried. 2-methylsulphonylnaphthalene-6-sulphonamide is thus obtained, M.P. 266–267° C.

The 2-methylsulphonyl-6-aminonaphthalene used as starting material may be obtained from 6-acetylaminonaphthalene-2-sulphonic acid by converting it to the sulphonyl chloride, then methylating the corresponding sulphonic acid derived from this with methyl sulphate and finally hydrolysing the 2-methyl-sulphonyl-6-acetylaminonaphthalene with aqueous hydrochloric acid.

Example 5

A solution of 25 parts of 4-methylthionaphthalene-1-sulphonamide in 150 parts of acetic acid is treated with 75 parts of 30% aqueous hydrogen peroxide solution and the mixture is warmed gently until the reaction commences and is then maintained at 95–100° C. for 30 minutes. The mixture is cooled to 20° C. and filtered and the solid residue is washed with water. It is then crystallised from acetic acid and there is thus obtained 4-methylsulphonylnaphthalene-1-sulphonamide, M.P. 234–235° C.

The 4-methylthionaphthalene-1-sulphonamide used as starting material may be obtained from 1-aminonaphthalene-4-sulphonic acid by a process similar to that described for 4-ethylthionaphthalene-1-sulphonamide at the end of Example 1 using methyl sulphate in place of ethyl sulphate for reaction with the aqueous solution of the sodium salt of 4-thionaphthalene-1-sulphonic acid.

Example 6

A solution of 10.6 parts of 4-n-propylthionaphthalene-1-sulphonamide in 60 parts of acetic acid is treated with 30 parts of 30% aqueous hydrogen peroxide solution and the mixture is then heated at 95–100° C. for 45 minutes. It is then treated with 2 parts of decolourising carbon, filtered hot and cooled to 20° C. After allowing to stand at 20–25° C. for 16 hours the mixture is filtered, the solid residue is washed with 50% aqueous acetic acid and then crystallised from acetic acid and dried. There is thus obtained 4-n-propylsulphonylnaphthalene-1-sulphonamide, M.P. 184–185° C.

The 4-n-propylnaphthalene-1-sulphonamide used as starting material may be obtained from 1-aminonaphthalene-4-sulphonic acid by a process similar to that described for the preparation of 4-ethylthionaphthalene-1-sulphonamide at the end of Example 1 using n-propyliodide in place of ethyl sulphate for the reaction with the aqueous solution of the sodium salt of 4-thionaphthalene-1-sulphonic acid. After crystallisation from n-propyl alcohol the 4-n-propylthionaphthalene-1-sulphonamide has M.P. 164° C.

Example 7

A solution of 22.5 parts of 4-p-chlorphenylthionaphthalene-1-sulphonamide in 300 parts of acetic acid is treated with 150 parts of 30% aqueous hydrogen peroxide solution and the mixture is heated at 95–100° C. for 45 minutes. The hot solution is then diluted with 150 parts of water, allowed to cool to 35° C. and then filtered. The filtrate is cooled in ice-water during the addition of 500 parts of water in portions over 5 hours. The mixture so obtained is filtered, the solid residue is washed with water and is then crystallised from acetic acid and dried. 4-p-chlorphenylsulphonylnaphthalene-1-sulphonamide thus obtained has M.P. 223–224° C.

The 4-p-chlorphenylthionaphthalene-1-sulphonamide used as starting material may be obtained from 4-thionaphthalene-1-sulphonic acid described at the end of Example 1. The aqueous solution of the sodium salt of 4-thionaphthalene-1-sulphonic acid is heated with p-chloronitrobenzene in the presence of sodium hydroxide.

The sodium salt of 4-p-nitrophenylthionaphthalene-1-sulphonic acid so obtained is converted to the corresponding sulphonamide by means of phosphorus pentachloride and phosphorus oxychloride followed by treatment of the sulphonylchloride with ammonia in acetone solution. The 4-p-nitrophenylthionaphthalene-1-sulphonamide is then reduced with iron in aqueous ethanol solution. The amino compound so obtained is diazotised and the diazonium salt is reacted with cuprous chloride in hydrochloric acid solution. There is thus obtained 4-p-chlorphenylthionaphthalene-1-sulphonamide of M.P. 217–219° C. after crystallisation from aqueous acetic acid.

Example 8

A solution of 17 parts of 4-ethylthionaphthalene-1-sulphonmethylamide in 100 parts of acetic acid is treated with 50 parts of 30% aqueous hydrogen peroxide solution and the mixture is heated at 95–100° C. during 45 minutes. The solution is then cooled to 20° C., diluted with 500 parts of water and allowed to stand at 20–25° C. for 3 hours. The mixture is filtered and the solid gummy residue is washed with water and crystallised twice from ethanol and dried. There is thus obtained 4-ethylsulphonylnaphthalene-1-sulphonmethylamide, M.P. 134–135° C.

The 4-ethylthionaphthalene-1-sulphonmethylamide used as starting material may be obtained from the sodium salt of 4-ethylthionaphthalene-1-sulphonic acid prepared as described at the end of Example 1. The sodium salt is treated with a mixture of phosphorus pentachloride and phosphorus oxychloride and the sulphonyl chloride is then reacted with an aqueous solution of methylamine in ethereal solution, to give 4-ethylthionaphthalene-1-sulphonmethylamide.

Example 9

A solution of 10 parts of 4-ethylthionaphthalene-1-sulphonethylamide in 60 parts of acetic acid is treated with 30 parts of 30% aqueous hydrogen peroxide solution and the mixture is heated at 95–100° C. during 45 minutes. The solution is then cooled to 20° C. and filtered and the solid residue is washed with water, crystallised from ethanol and dried. There is thus obtained 4-ethylsulphonylnaphthalene-1-sulphonethylamide, M.P. 132° C.

The 4-ethylthionaphthalene-1-sulphonethylamide used as starting material may be obtained from the sodium salt of 4-ethylthionaphthalene-1-sulphonic acid, prepared as described at the end of Example 1. The sodium salt is reacted with phosphorus pentachloride and the sulphonyl chloride is then treated with an aqueous solution of ethylamine in acetone solution to give 4-ethylthionaphthalene-1-sulphonethylamide.

Example 10

A solution of 9.65 parts of 4-ethylthionaphthalene-1-sulphonisopropylamide in 60 parts of acetic acid is treated with 30 parts of 30% aqueous hydrogen peroxide solution and the mixture is heated at 95–100° C. for 45 minutes. The solution is then diluted with 20 parts of water and cooled in ice-water until crystallisation is complete. The mixture is filtered and the solid residue is washed with water, recrystallised from ethanol and dried. There is thus obtained 4-ethylsulphonylnaphthalene-1-sulphonisopropylamide, M.P. 146–147° C.

The 4-ethylthionaphthalene-1-sulphonisopropylamide used as starting material may be obtained by a process similar to that described at the end of Example 9 for the preparation of 4-ethylthionaphthalene-1-sulphonethylamide using an equivalent proportion of isopropylamine in place of ethylamine. The 4-ethylthionaphthalene-1-sulphonisopropylamide so obtained has M.P. 114–116° C.

Example 11

A solution of 10.1 parts of 4-ethylthionaphthalene-1-sulphonisobutylamide in 60 parts of acetic acid is treated with 30 parts of 30% aqueous hydrogen peroxide solution and the mixture is heated at 95–100° C. during 45 minutes. The mixture is then diluted with 20 parts of water and cooled in ice-water until crystallisation is complete. The mixture is filtered and the solid residue is washed with water, crystallised from ethanol and dried to give 4-ethylsulphonylnaphthalene-1-sulphonisobutylamide, M.P. 117–118° C.

Example 12

A solution of 1.6 parts of 30% aqueous hydrogen peroxide in 10 parts of acetic acid is added during 30 minutes to a stirred mixture of 5.3 parts of 4-ethylthionaphthalene-1-sulphonamide and 20 parts of acetic acid at 27–30° C. The stirring is continued for a further 16 hours allowing the temperature to fall to 20–25° C. The mixture is filtered and the solid residue is then washed with a small amount of acetic acid, crystallised from acetic acid and dried. There is thus obtained 4-ethylsulphonylnaphthalene-1-sulphonamide, M.P. 200–201° C. with decomposition.

Example 13

A solution of 3.2 parts of chromium trioxide in 10 parts of acetic acid and 10 parts of water is added over 60 minutes to a stirred solution of 3.1 parts of 4-ethylthionaphthalene-1-sulphonamide in 20 parts of acetic acid at 50–60° C. The mixture is heated to 90° C. during 30 minutes and is then poured on to 200 parts of ice. The mixture is filtered and the solid residue is washed free from acid with cold water. It is then crystallised from ethanol to give 4-ethylsulphonylnaphthalene-1-sulphonamide, M.P. 198° C.

Example 14

A solution of 2.6 parts of 4-ethylthionaphthalene-1 sulphonamide in 110 parts of water containing 0.75 part of potassium hydroxide is stirred and cooled to 25° C. and 4 parts of potassium permanganate are added over 30 minutes. The temperature of the mixture during the addition is maintained at 25–30° C. The suspension is stirred for a further 90 minutes at 20–25° C. and is then treated with sulphur dioxide until an almost colourless precipitate and a colourless solution are obtained. The mixture is filtered, the solid residue is washed free from acid with cold water and is crystallised from ethanol. There is thus obtained 4-ethylsulphonylnaphthalene-1-sulphonamide, M.P. 198° C.

Example 15

A mixture of 10 parts of the sodium salt of 4-ethylthionaphthalene-1-sulphonic acid (prepared as described at the end of Example 1), 30 parts of acetic acid and 15 parts of 30% aqueous hydrogen peroxide is stirred during 4 hours. The temperature of the mixture is allowed to rise to a maximum of 45° C. and then allowed to drop to 25° C. The solution is filtered from a small amount of insoluble matter and is then evaporated to dryness in vacuo below 40° C. The residual solid is finally dried in vacuo over sodium hydroxide at 20–25° C. 10 parts of the product so obtained are thoroughly mixed by grinding with 15 parts of phosphorus pentachloride. The oil so produced is poured on to 300 parts of crushed ice and the mixture is well stirred. The partly solid sulphonyl chloride so obtained is washed several times with ice-water by decantation and is then added to a mixture of 44 parts of aqueous ammonia solution (density=0.88) and 120 parts of acetone. The solution is evaporated to remove most of the acetone and some of the excess of ammonia and the residue is then diluted with ice-water. The mixture is filtered, the solid gummy residue is washed with cold water, crystallised from aqueous ethanol, and then recrystallised twice from ethanol. There is thus obtained 4-ethylsulphonylnaphthalene-1-sulphonamide, M.P. 198° C.

Example 16

250 parts of 4-ethylsulphonylnaphthalene-1-sulphonamide are mixed with 40 parts of maize starch and the mixture is granulated with 70 parts of a 10% aqueous paste of maize starch. The granules are passed through a 16-mesh screen and are then dried at 50–55° C. After further passage through a 16-mesh screen, 3 parts of magnesium stearate are added to the granules and the mixture is compressed into tablet form. There are thus obtained tablets suitable for oral administration for therapeutic purposes.

Example 17

A mixture of 250 parts of 4-ethylsulphonylnaphthalene-1-sulphonamide, 47 parts of maize starch and 3 parts of magnesium stearate is compressed into slugs which are then granulated by passing through a 16-mesh screen. The granules are then compressed into tablet form and there are thus obtained tablets suitable for oral administration for therapeutic purposes.

Example 18

A mixture of 40 parts of icing sugar, 1.5 parts of sodium carboxylmethyl cellulose (viscosity 47.6 centipoises), 0.135 part of heptadecaethylene-oxycetanol, 0.1 part of methyl p-hydroxybenzoate and 0.05 part of propyl p-hydroxybenzoate is stirred in 60 parts of water. The pharmaceutical base thus obtained is ball-milled with 5 parts of 4-ethylsulphonylnaphthalene-1-sulphonamide and there are then added suitable colouring and flavouring materials. There is thus obtained a stable aqueous suspension suitable for administration for therapeutic purposes.

What we claim is:

1. A sulphonamide selected from the group consisting of 4-ethylsulphonylnaphthalene-1-sulphonamide and 4-ethylsulphonylnaphthalene-1-sulphonmethylamide.
2. A process for making a sulphonamide as defined in claim 1 which comprises oxidizing a member of the group consisting of 4-ethylthionaphthalene-1-sulphonamide and 4-ethylthionaphthalene-1-sulphonmethylamide.
3. The process of claim 2 wherein said member is oxidized in the presence of an oxidizing agent selected from the group consisting of hydrogen peroxide, chromium trioxide and potassium permanganate.
4. The process of claim 2 wherein said member is oxidized by treating a solution of the same in acetic acid with hydrogen peroxide at a temperature between 95 and 100° C.
5. A pharmaceutical composition including, as the essential active ingredient, a sulphonamide as defined in claim 1, and a carrier therefor.

References Cited in the file of this patent

UNITED STATES PATENTS 2,510,495  Brown _____ June 6, 1950

OTHER REFERENCES

Chem. Abstr., vol. 42, 1948, p. 6765c.
Chem. Abstr., vol. 44, 1950, p. 7795f.
Chem. Abstr., vol. 46, 1952, p. 3965c.
Northey: Sulfonamides and Related Compounds, Reinhold Pub. Co., N.Y., 1948, pp. 11–13, 19, 20, 295, 296.
Wilson et al.: Organic Chem. in Pharmacy, Lippincott Co., Phila., 1949, p. 79.